United States Patent [19]
Dan-Harry

[11] Patent Number: 5,485,365
[45] Date of Patent: Jan. 16, 1996

[54] HIGH FREQUENCY, HIGH DENSITY POWER CONVERSION SYSTEM

[76] Inventor: Dawari D. Dan-Harry, 145 Ward St., #53, Revere, Mass. 02151

[21] Appl. No.: 50,513

[22] Filed: Apr. 20, 1993

Related U.S. Application Data

[63] Continuation-in-part of Ser. No. 647,065, Jan. 29, 1991, abandoned.

[51] Int. Cl.$^6$ .................................................. H02M 7/5387
[52] U.S. Cl. .................................................. 363/132; 363/17
[58] Field of Search ...................... 307/2, 127; 323/299, 323/301; 363/17, 24, 25, 26, 97, 98, 132, 134

[56] References Cited

U.S. PATENT DOCUMENTS

| | | | |
|---|---|---|---|
| 4,513,364 | 4/1985 | Nilssen | 363/132 |
| 4,533,986 | 8/1985 | Jones | 363/17 |
| 4,809,310 | 2/1989 | Salesses et al. | 363/98 |
| 4,860,184 | 8/1989 | Tabisz et al. | 363/132 |
| 4,864,479 | 9/1989 | Steigerwald et al. | 363/17 |
| 4,959,765 | 9/1990 | Weinberg | 363/134 |
| 5,043,680 | 8/1991 | Gurwicz | 363/131 |
| 5,065,301 | 11/1991 | Shioya et al. | 363/17 |
| 5,099,410 | 3/1992 | Divan | 363/98 |
| 5,325,283 | 6/1994 | Farrington et al. | 363/132 |
| 5,345,374 | 9/1994 | Sato et al. | 363/24 |

*Primary Examiner*—Jeffrey L. Sterrett
*Attorney, Agent, or Firm*—Brian M. Dingman

[57] ABSTRACT

A high-frequency, high-density power conversion system providing lossless power switching with a single or double-ended power converter, the single ended converter including a pair of input terminals for receiving dc or rectified ac voltage, a transformer with its primary across the input terminals, a transistor in series between an input terminal and the transformer primary, and a dedicated inductor in series between the other input terminal and the other side of the primary, in which the transistor is switched to provide a sinusoidal output current pulse to the transformer primary.

8 Claims, 9 Drawing Sheets

HIGH FREQUENCY, HIGH DENSITY POWER CONVERSION SYSTEM

RELATED APPLICATION

This application is continuation in part of Ser. No. 647,065, filed on Jan. 29, 1991.

FIELD OF THE INVENTION

The present invention relates to AC/DC, DC/DC, and DC/AC converters and it is directed towards eliminating switching losses that occur in a controlled switch of a power converter while increasing the switching frequency to the 1 to 10 mega-Hertz range.

BACKGROUND OF THE INVENTION

Switching power conversion systems have relied on manual switches or electro-mechanical switches in order to configure an input voltage to either a full wave or voltage doubler configuration. Where an opto-triac has been used it has not been properly synchronized with the control circuit for proper coordination and control of the entire system. It is desirable to have a configuration circuit controlled by a controller circuit. This ensures that the converter will not operate until an adequate line voltage is available. Further, this method reduces component count and is cost effective.

Power conversion is generally accomplished by the switching method known as pulse width modulation (PWM). In the PWM method, voltage and current transition overlap, resulting in significant switching losses in the controlled switching element. The operating frequency of a converter operating by the PWM method is also limited in part by the parasitic elements in the controlled switching element. Resonance switching methods have been proposed to decrease switching losses by allowing current/voltage transition in the controlled switch to occur as much as possible at zero current or zero voltage. However, the resonance switching requires both a resonance inductor ($L_r$) and a resonance capacitor ($C_r$). This arrangement can accomplish switching at the desired time in the cycle, but it allows the energy stored in the parasitic capacitance of the switch to go to waste instead of being utilized for energy conversion. For very fast switching of small energy packets, this energy loss becomes significant.

U.S. Pat. No. 4,860,184 by W. A. Tabisz et al. discloses Half-Bridge zero-voltage switched multi-resonant converters. This invention uses the designed high leakage inductance of the power transformer, and resonant capacitors placed in parallel to the rectifier diodes on the secondary side of the power transformer, to constitute a quasi-resonant converter. Such a converter utilizing leakage inductance as its primary resonant inductive element must place most if not all of its resonant capacitance on the secondary side of the transformer in order to fully account for the leakage inductance, which manifests itself as a secondary side element. Hence it is a secondary side resonance but not a full half sinusoidal resonant converter. This type of power conversion which relies mainly on the leakage inductance of the power transformer, uses a conventional transformer construction in which either the secondary conductors are wound on top of the primary conductors, or vice versa. Further, the transformer turn ratio can be increased to enhance the leakage inductance value. This approach results in a significantly high transformer leakage inductance value, that is sufficient to be the resonant inductor.

One disadvantage of not minimizing leakage inductance, but encouraging or increasing it as Tabisz requires in order to achieve resonance, is that while high frequency switching is achieved, only either turn-on or turn-off losses of the switching element are eliminated, but not both. Also, such designed high leakage inductance is difficult to repeatably manufacture.

A transformer having high leakage inductance stores a significant amount of energy in the transformer core; this energy is then released when the switching element is turned off. The energy so released must be snubbed out by a very large, expensive, and power dissipative resistor/capacitance (RC) snubber or damping circuit so that the switching element will not be destroyed after a few switching cycles. High leakage inductance also increases Electro-Magnetic Interference (EMI) because of the menacing resonant oscillation caused by the leakage inductance and inter-winding capacitance of the transformer. Accordingly, an EMI input filter is required in systems such as Tabisz to reduce or eliminate the EMI. When leakage inductance is high, the magnetizing inductance of the power transformer is low compared to a low leakage inductance transformer. High magnetizing current is a waste, hence the current required for conversion in these systems is higher; this causes higher conduction losses in the switching element. Also, the leakage inductance in series with the parallel combination of both the junction capacitance of the rectifying diode and the resonant capacitor will ring during the time the rectifying diode is conducting. The ringing caused by these elements also has to be snubbed out by a power-dissipating RC circuit, or the ripple on the output of the converter will be high.

U.S. Pat. No. 4,959,765 by A. Weinberg discloses a DC/DC converter using quasi-resonance. This DC/DC converter uses an input capacitor, all stray capacitors including those inherent in the switching element, the transformer leakage inductance, the magnetizing inductance of the power transformer, and an output inductor as its resonant elements. This converter as disclosed has all the problems stated in the case of Tabisz et al. Additionally, its low magnetizing inductance will cause a high magnetizing current which is wasteful. This high magnetizing current also requires a long off time in order to completely demagnetize the transformer core before commencing the next switching period. The obvious disadvantage of long off time is in limiting output power, power density, and most importantly the response to rapid load and line changes because any change in line and or load can be responded to only in the next switching period. This type of system is particularly suited for extra low input voltage converters because of the long off time required to reset the transformer core.

U.S. Pat. No. 4,864,479 by Steigerwald et al. discloses a Full-Bridge Lossless switching converter. This invention uses the parasitic capacitance of the switching element and the transformer leakage and magnetizing inductance to exchange energy. This invention, while demonstrating that leakage inductance can be reduced to a low level of 0.1 uH, is not a resonant converter since the resonant tank is not clearly defined. Rather, inherent parasitics are used to shape the switch wave signal in order to achieve substantially low switching power losses.

Presently available power control integrated circuits are not able to modulate and vary frequencies in the mega Hz range, cannot be plugged/unplugged while hot, and are not common to all power conversion systems within a given series without regard to input and output voltage or power output capability. Further, for precise performance of essential housekeeping functions, it is necessary that most housekeeping functions be implemented on a single integrated substrate, unlike the present mixture of discrete and integrated components. Using an integrated substrate will result in uniform manufacturing repeatability and will be cost effective.

SUMMARY OF THE INVENTION

It is the primary object of the present invention to overcome the above problems of the prior art.

It is another object of the present invention to provide an integrated control module (USPCM) to handle the following housekeeping functions:

1. Input voltage configuration to either a full-wave or a voltage doubler configuration for any two predetermined ranges of voltage.

2. Provide level shifting and $V_{gs}$ drive current capable of up to two amps.

3. Sensing of DC line input voltage to determine if the voltage level is adequate for a given converter.

4. DC line high input voltage startup regulation.

5. Supply power to the low voltage regulator through the transformer's auxiliary winding for continuous internal power supply to USPCM.

6. Isolated feedback network.

7. Very high frequency modulation.

8. Remote shutdown

9. Soft start operation.

10. Capable of being plugged into or removed from power converter board hot.

It is a third object of the present invention to use a transformer construction having minimal leakage inductance, that is functionally insignificant and hence does not contribute to resonance. Further, any ringing caused by the minimal leakage inductance and inter-winding capacitance after the switching element is turned off, or when the output diode is conducting, will have extremely low amplitude and energy so that snubbing or an EMI input filter is not required. There are four possible ways such a transformer can be constructed.

1. A transformer constructed using flat conductors (copper foil) and conventional transformer bobbin, with the secondary winding sandwiched by each half of the primary winding. Such a construction has very low leakage inductance of less than 1 uH.

2. A transformer constructed using toroidal cores will have no leakage inductance.

3. A transformer constructed by the planar method will have leakage inductance less than 0.45 uH. The following references on planar transformer design and construction are herein incorporated. "Design of a high-frequency planar power transformer in multilayer technology", by Dirk van Linde, Corlex A. M. Boon and J. Ben Klaassens, *IEEE Transaction on Industrial Electronics*, Vol. 38 No. 2, April 1991. "The relationship between size and power dissipation in a 1–10 mHz transformer", by Andrew F. Goldberg and Martin F. Schlect, *IEEE Transactions on Power Electronics*, Vol. 7, No. 1, January, 1992, and "Design issues for the transformer in a low-voltage power supply with high efficiency and high power density", by Khai D. T. Ngo et al., *IEEE Transactions on Power Electronics*, Vol. 7 No. 3, July 1992. These references disclose power transformers constructed having leakage inductances as low as 22 nH.

It is a fourth object of the present invention to use a transformer having a very high primary inductance $L_m$ of about 100 times the resonant inductance, and about 10,000 times the leakage inductance. The advantage of high primary inductance is low magnetizing current ($I_m = \{V_{in} * T_{on}\} * L^{-1}_m$). Since magnetizing current contributes no output power to the load but only moves the transformer core across the hysteresis loop, it is a waste when it is too high. The transformer primary inductance is determined solely by the transformer turn ratio. Hence, once the resonant inductance of the circuit is known, a transformer turn ratio can be chosen so that the primary inductance is about 100 times the resonant inductance. The resonant inductance value depends on both the output power required and the resonant frequency. The transformer is then constructed so that the ratio of primary to leakage inductance is about 10,000:1.

It is a fifth object of the present invention is to use a primary dedicated resonant inductor $L_r$ in series combination with the resonant capacitor $2*C_{oss}$ to form a primary side resonant tank having characteristic impedance $Z=\omega*L_r=(\omega*C_{oss})^{-1}$, in which the impedance limits peak primary current.

A controlled high-speed, high-efficiency electronic switch (transistor), for example a MOSFET switch driven at a very high frequency, has a significantly large amount of energy stored in the junction capacitance during each switching cycle. I have found that this energy can be properly utilized for conversion and the transistor capacitance can be used as the resonant frequency ($F_r$) switching component. This will increase switching frequency, improve converter efficiency (more than 90% efficiency), eliminate EMI, eliminate the need for both switching element and rectifying element snubbers, eliminate the need for EMI radiation input filters and above all increase power density (up to 70 watts per cubic inch) due to the low number of components and the negligible waste heat that must be dissipated.

In order to accomplish the above objectives two power MOSFET switches each having an effective junction capacitance ($C_{oss}$) are connected to each other in source-drain configuration with the source-drain node connected in series to an inductor ($L_r$) and a transformer (T) having a very high magnetizing inductance ($L_m$) (at least 100 times greater than the value of $L_r$ so that resonance is not affected by the value of $L_m$) and hence very low magnetizing current ($I_m$), and extremely low leakage inductance ($L_l$),( total $L_l$ less than 1 uH). The dedicated inductor ($L_r$) forms a series resonance tank with the junction capacitance $C_{oss}$ that is parallel loaded.

This arrangement is equivalent to placing the resonant capacitor ($C_r$) in parallel to the controlled switch which allows the controlled switch voltage to rise slowly at turn-off of the switch, and ring back sinusoidally, so that the controlled switch current will rise and fall to zero before the rise of the switch voltage to eliminate switching losses.

Thus, I have accomplished a resonant tank solely made of a dedicated resonant inductor $L_r$ and the output capacitance of the switching element $C_{oss}$ located on the primary side of a power transformer in which the receiving voltage from a voltage source is the only source of energy used up each cycle for power conversion.

BRIEF DESCRIPTION OF THE DRAWINGS

Other objects, features and advantages will occur to those skilled in the art from the following description of a preferred emobodiment and the accompanying drawings in which.

DETAILED DESCRIPTION OF THE PREFERRED EMBODIMENT

Embodiments of the present invention will be described with reference to the drawings.

Figure 1:
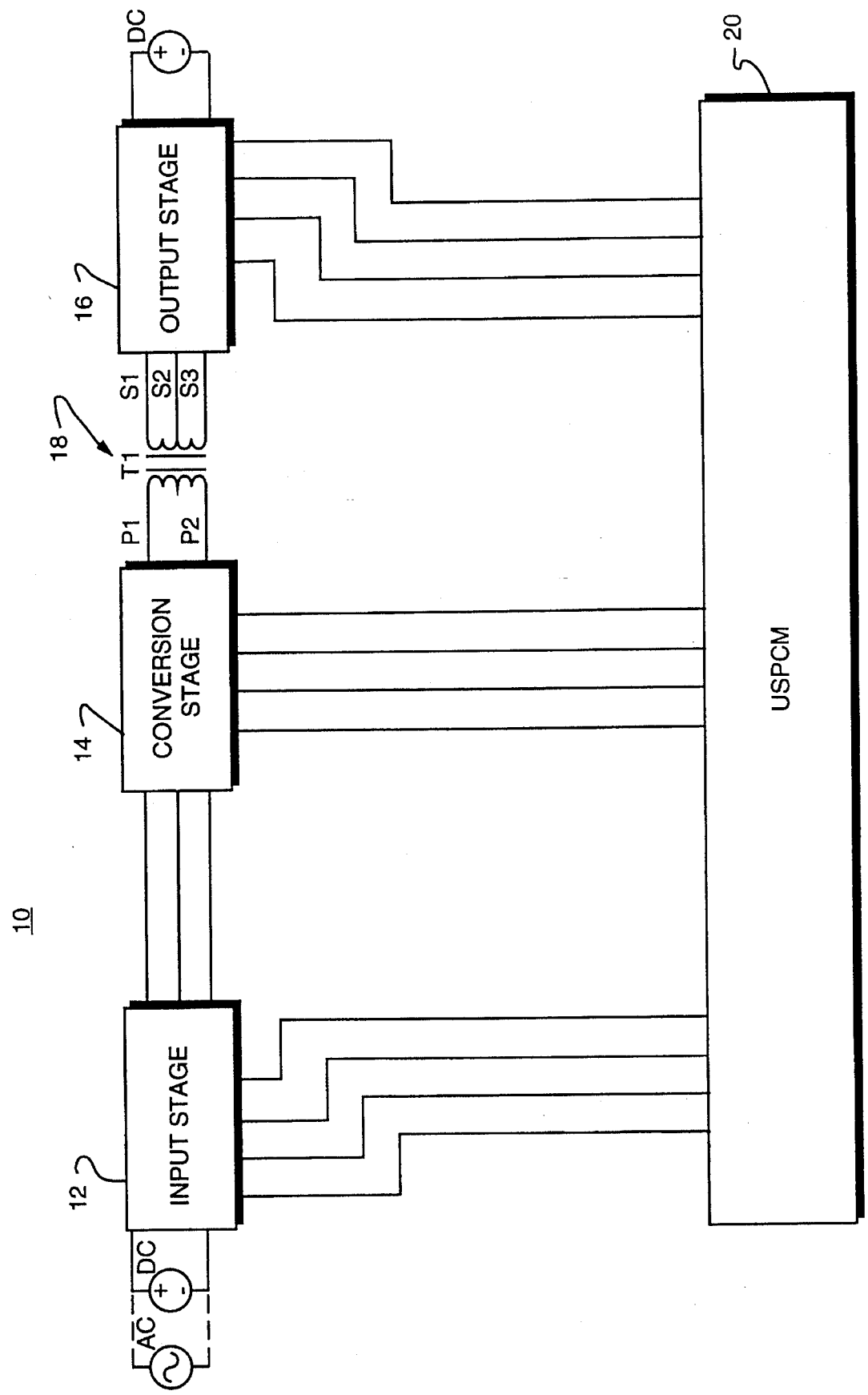
FIG. 1 is a block diagram of the preferred embodiment of the power conversion system of this invention.

The power converter system 10 of this invention, FIG. 1, is divided into a number portions: input stage 12, conversion stage 14, output stage 16, and USPCM 20 for easy description and clarity in understanding its operation. FIG. 1 is a block diagram showing the entire converter and its interconnection. Transformer 18 couples power from the conversion stage to the output stage. Input stage 12 can accept an AC or DC input.

Figure 2:
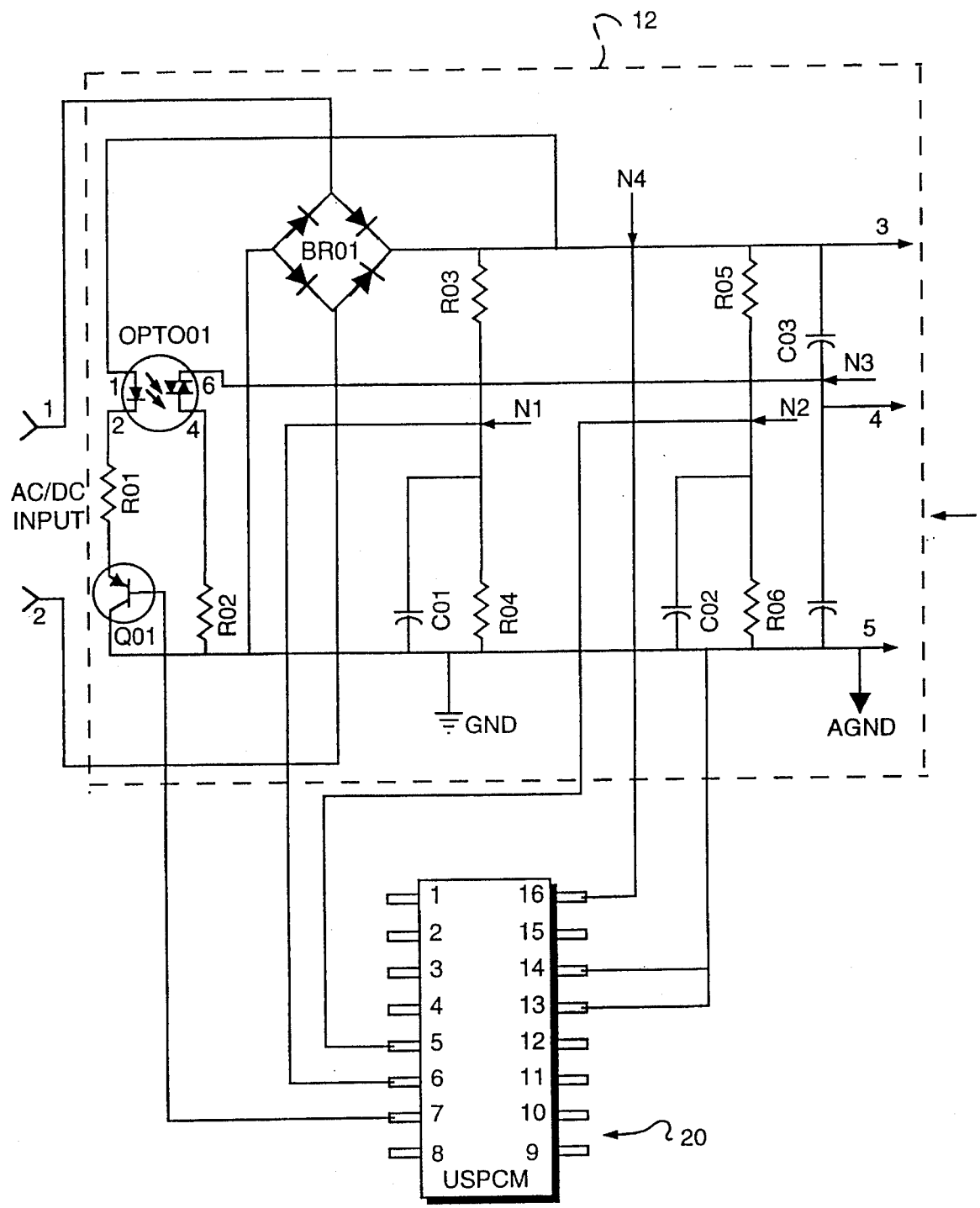
FIG. 2 is a schematic diagram of a preferred embodiment of the input stage of the system of FIG. 1.

Referring to FIG. 2, there is shown in more detail the input stage 12 of the power conversion system including a pair of input terminals 1 and 2 for connecting the converter to a source of AC/DC power. The input terminals 1 and 2 are connected to a bridge rectifier BR01 having its negative pin connected to a common ground connection and the positive pin connected to the following: positive pin of the charge holding capacitor C03 that is series connected to the charge holding capacitor C04 at node N3, resistor R03 which is in series to a parallel connection of resistor R04 and to a bypass capacitor C01 at node N1 and resistor R05 which is in series to a parallel connection of resistor R04 and bypass capacitor C02 at node N2. Terminal 2 is also connected to pin 4 of the optocoupler triac OPTO01 via resistor R02. Pin 6 of OPTO01 is also connected to node 3 in open or short circuit configuration. Pin I of OPTO01 is connected to the positive pin of bridge rectifier BR01 and its pin 2 is connected to the emitter of Q01 via a current limiting resistor R01. The collector of Q01 is connected to ground. The base of Q01, the nodes 1, and 2 and the positive pin of bridge rectifier BR01 are connected to pins 7, 6, 5, and 16 of the USPCM respectively. Terminals 3, 4 and 5 are for onward connection to the conversion and output stage.

Figure 7:
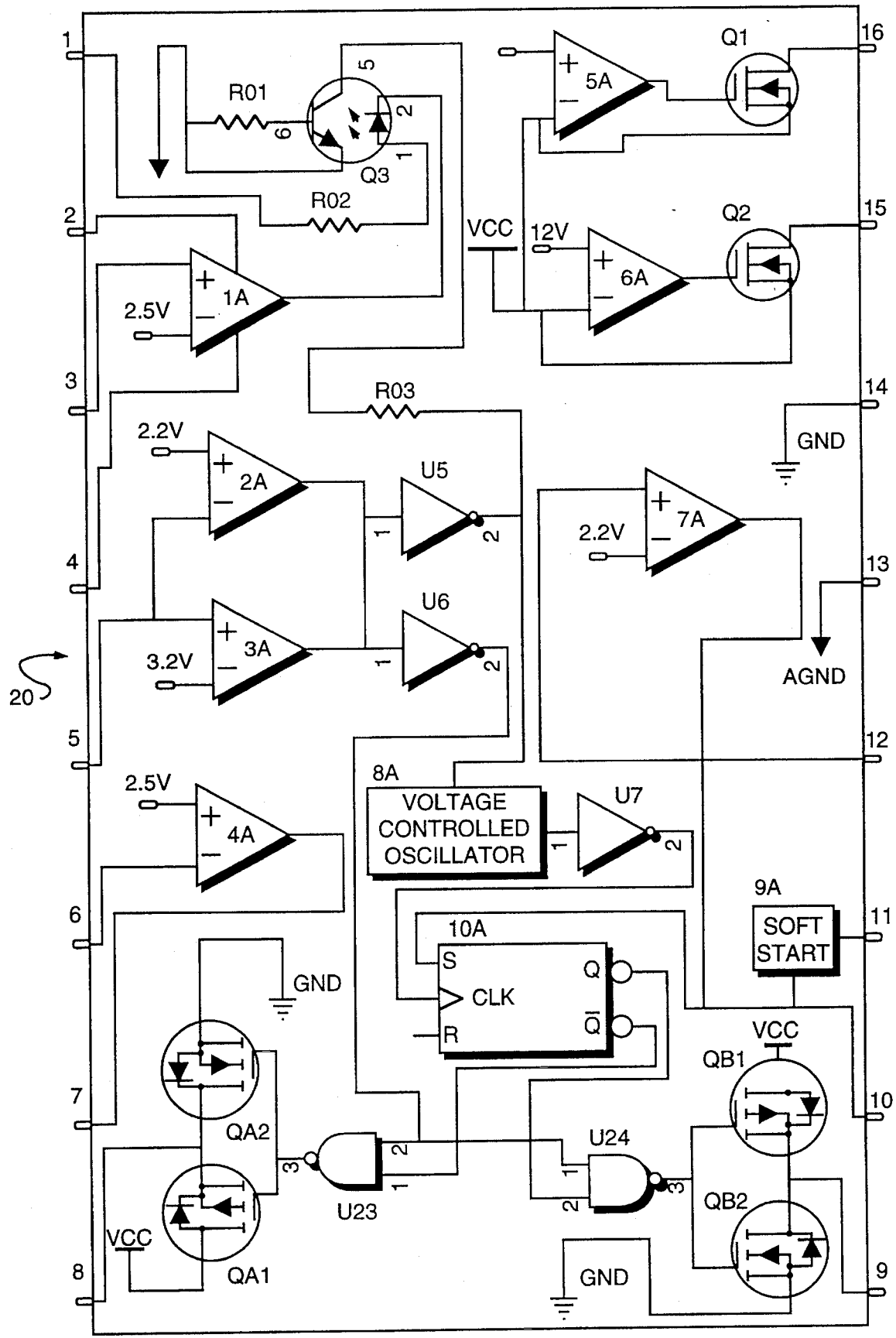
FIG. 7 is a schematic block diagram of a functional circuit illustrating the preferred embodiment of the USPCM of the power conversion system of this invention.

Referring to FIG. 7 the USPCM 20, Pin 16 is connected to node 4, the DC high voltage line. Looking into pin 16 of USPCM 20 an integral high voltage (450 volts rated) MOSFET Q1 that operates in depletion mode is connected to an amplifier circuit 5A referenced at 10 volts in order to implement a linear regulator with an output voltage of 12 volts . This is a startup regulator that provides the initial power to the USPCM. Q2 is a second regulator of the type described above but of low voltage depletion mode MOSFET. 6A is an amplifier circuit referenced at 12 volts but supplied voltage through pin 15 by the low voltage auxiliary winding (not shown in any diagram) of transformer T01 of FIG. 3. Because the outputs of both regulators feed into one another, the low input regulator, when operational, will shut down the startup voltage regulator.

With power present in the USPCM, it senses the voltage level present at terminal 3 through node 1 and if the voltage level is below the magnitude of a pre-set level the source/sink current comparator circuit 4A that is normally sourcing current will sink current thereby biasing the base of Q01 negative, and Q01 will forward bias the diode of OPTO01 through the current limiting resistor R01. This will bias the normally high impedance triac of OPTO01 to a low impedance thereby completing a connection between terminal 2 via the low resistive element R02 and node 3, hence a voltage doubler configuration. If terminal 3 is within a preset voltage level, circuit 4A will continue to source current and the above described action will not take place and the input voltage configuration will then be a full-wave configuration.

Circuits 2A and 3A are comparators with normally low outputs. The said comparators compare the voltage level of the DC line at terminal 3 by sensing the voltage present at node 2 to their respective references (2.2 v & 3.2 v) to determine if it is within a predetermined range. If the DC line is below range, circuit 2A output goes high causing the normally high inverters U5 and U6 to go low shutting down circuit 8A the voltage controlled oscillator circuit and the nand gates U23 and U24 that drive the gates of the MOSFET P-junction and N-junction totem-pole QA1 and QA2 configuration and QB1 and QB2 configuration, respectively.

Referring to FIGS. 3, 4, 5 and 6, to increase the frequency of the power conversion system to the mega Hertz range, and also improve power conversion efficiency, the controlled switch voltage transition must not overlap the current transition. Hence the controlled switch current must rise slowly from zero in time for the turn-on transition, and ring back sinusoidally to zero in time for turn-off transition. To achieve this precise turn-on and turn-off the control circuit driving the controlled switch must terminate the gate drive pulse at a precise time. Further, in order to achieve resonance in the mega Hertz frequency range without compromising efficiency, the inherent junction capacitance ($C_{oss}$) of a MOSFET switch offers a suitable and adequate solution.

The energy stored in the inherent capacitance $C_{oss}$ is given by the formula:

$$\text{Energy} = C_{oss} * V^2 2^{-(1/2)}$$

for a one switch converter and $$\text{Energy} = 2 * C_{oss} * V^2 * 2^{-(1/2)}$$

for a two switch converter.

This represents energy that is lost in known systems employing a discrete capacitor in parallel with the switch.

The resonant frequency of the conversion stage omega is given by the formula:

$$\begin{aligned}\text{Omega} &= (L * C)^{-(1/2)} \text{ rads/sec} \\ &= (L_r * C_{oss})^{-(1/2)} \text{ rads/sec}\end{aligned}$$

for a one switch converter, and $$\text{Omega} = (L_r * 2 * C_{oss})^{(1/2)} \text{ rads/sec}$$

for a two switch converter.
$F_r$ resonant frequency) is:

$$F_r = (2*\pi)^{-1} * (C_{oss} * L_r)^{-(1/2)} \text{ Hz}$$

for one switch converter and $$F_r = (2*\pi)^{-1/2} * (2*C_{oss}*L_r)^{-(1/2)}$$

for two switch converter.

$$P_{tank} = (C_{oss}*V^2*F_{max})2^{-1}$$

$$C_{oss} = 2*P_{tank}(V^2*F_{max})^{-1}$$

where $F_{max}$ is the switching frequency, and $P_{tank}$ is total power present in the resonant tank.

Figure 3:
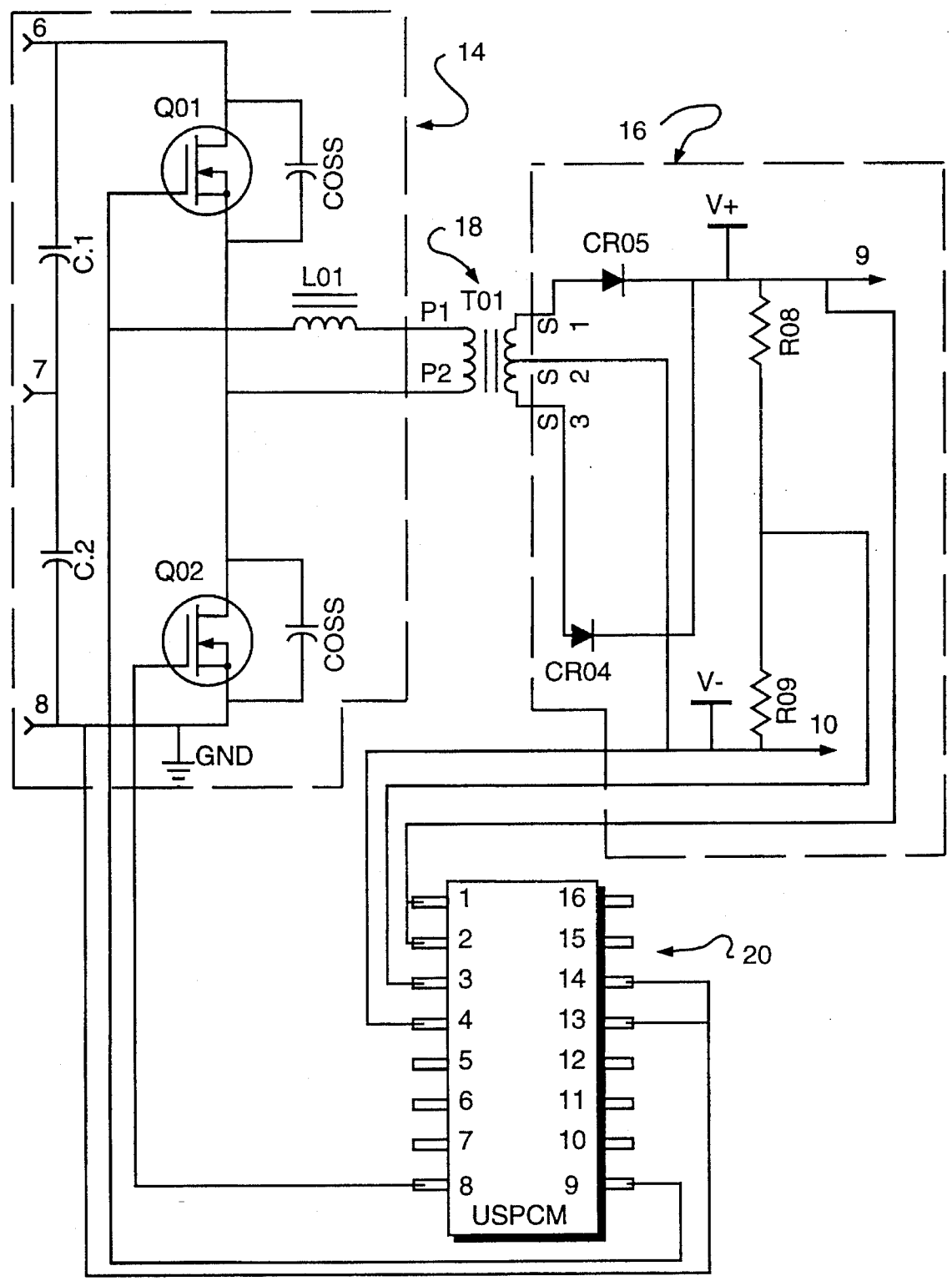
FIG. 3 is a schematic diagram of a preferred embodiment of the conversion and output stage of the system of FIG. 1.
Figure 4:
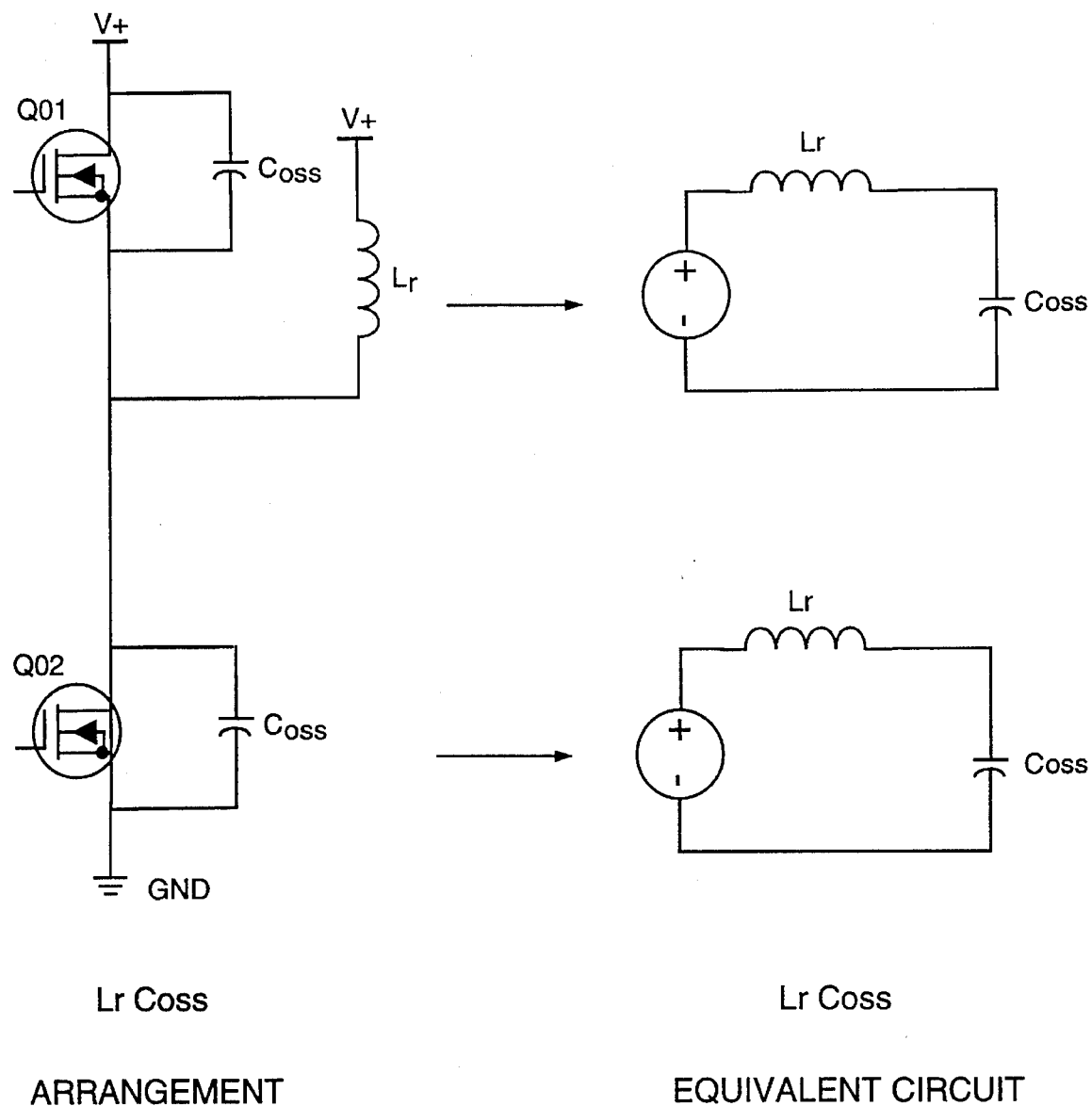
FIG. 4 is a schematic diagram of a portion of the conversion stage of FIG. 3 also illustrating the equivalent circuit.

The USPCM 20, FIG. 7, drives the base of MOSFET devices Q01 and Q02, FIG. 3 through pin 8 and pin 9, respectively. The totem pole configuration of the USPCM drive circuits comprising of P-channel and N-channel MOSFET QA1 and QA2 of output pins and QB1 and QB2 are capable of sourcing short current pulses of more than two amps. Feedback control is through pins 1, 2, 3 and 4. Circuit 1A provides error amplification and isolation is provided by USPCM optocoupler Q3. Q3 collector decreases or increases linearly the voltage supply of circuit SA thereby causing the period of its oscillation to vary accordingly.

The power transformer T is designed to minimize leakage inductance ($L_i$) to a level that it is functionally insignificant, while the primary magnetizing inductance $L_m$ ratio to leakage inductance $L_i$ is at least 600:1, and the primary inductance $L_m$ ratio to resonant inductance is at least 100:1. Preferably, the ratio of primary inductance to resonant inductance to leakage inductance is about 100:1:0.01; the range of the ratio of primary to resonant to leakage inductance however may be from 50:0.5:0.001 to 1000:1:0.1. A low $L_i$ value of the order less than 1 uH and low interwinding capacitance $C_w$ will cause the switching element voltage at turn-off to oscillate at ringing frequency given by:

$$F_{ringing} = (2*\pi)^{-1}*(L_i*C_w)^{-(1/2)} Hz$$

and absorb (if not snubbed) energy given by:

$$E_{ringing} = (L_i * I^2 peak) * 2^{-1} uJ$$

where $I_{peak}$ is the peak primary current. Hence reducing the leakage inductance has the singular advantage of reducing this energy to a level that a snubber circuit and EMI filters are not required. The most significant advantage is improved converter efficiency since losses due to leakage inductance lowers efficiency.

Figure 5A:
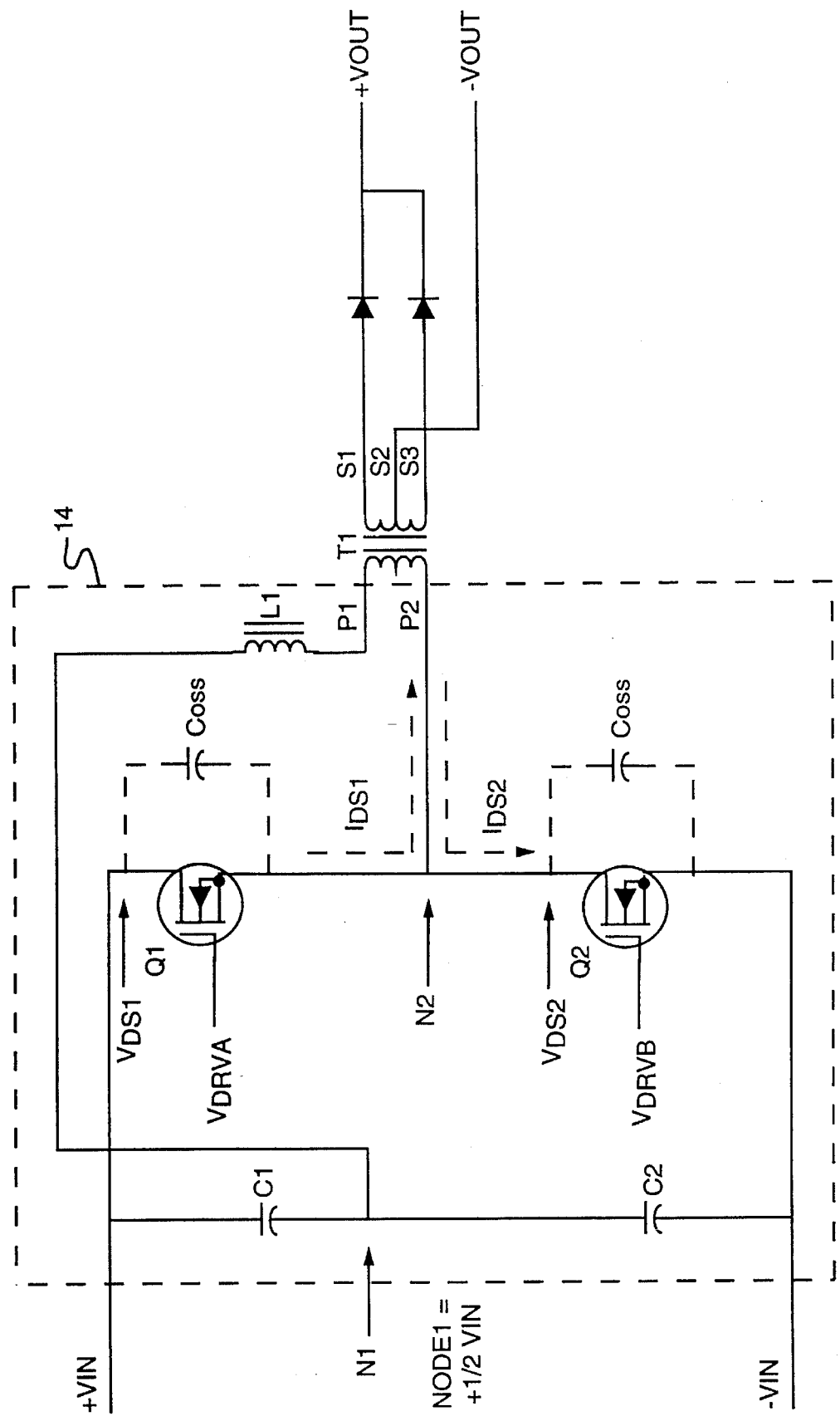
FIG. 5A is a more detailed schematic diagram of the conversion stage of FIG. 3.
Figure 5B:
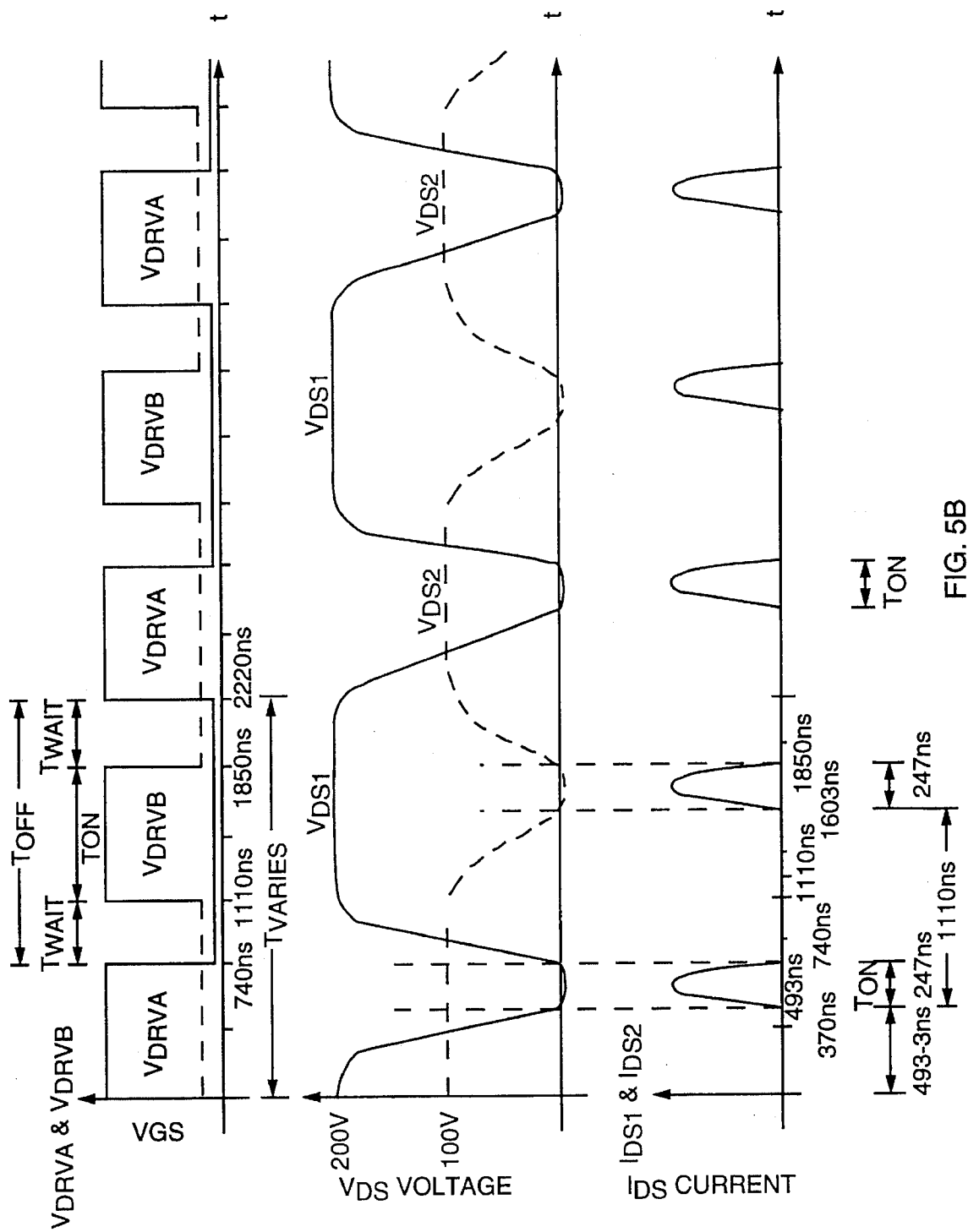
FIG. 5B is a timing diagram illustrating the operation of the conversion stage of FIG. 5A.

EXPLANATION OF TIME CHARTS FOR HALF BRIDGE CONFIGURATION (FIGS. 5A and 5B)

1. Assume maximum input of voltage=200 vdc at terminal 6 (+Vin)

2. Switching frequency of each switch=450 KHz

3. Switch period (T) each switch=2220 nanoseconds

4. ON period $T_{ON}$ for each switch=740 nanoseconds

5. OFF period $T_{OFF}$ for each switch=1480 nanoseconds

6. Zero wait state period $T_{WAIT}$ between each gate switch transition=370 nanoseconds.

Given the above assumptions, at t=0, $V_{DRVA}$ at the base of Q1 is high and $V_{DS1}$ is undergoing transition from $V_{DS1}$=200 vdc to $V_{DS1}$=0 vdc. The series combination of the dedicated resonant inductor L1 and the inherent output capacitance ($C_{oss1}$) of Q1 shapes the falling $V_{DS1}$ into a sinusoidal wave by gradually discharging the energy stored in them. This action represents the discharging of the resonant tank formed by L1 and $C_{oss1}$. At the instant $V_{DS1}$ is equal to zero a sinusoidal current $I_{DS1}$ flows into the transformer T1 through node N1. At the instant of the sinusoidal current $I_{DS1}$ t is equal to 493.3 nanoseconds, and at the end of $I_{DS1}$ transition t is equal to 740 nanoseconds. At t equal to 740 nanoseconds, $V_{DS1}$ transition from zero to 200 vdc commences; this is the charging of the resonant tank due to the series combination of $C_{oss1}$ and L1.

Since there is no overlap of the current pulse with the voltage waveform, there is virtually no switching loss. At t less than or equal to 1110 nanoseconds, $V_{DRVB}$ is equal to zero and $V_{DS2}$=100 vdc. At t=1110 nanoseconds, $V_{DRVB}$ undergoes a transition from a low state to a high state, while $V_{DS2}$ undergoes a sinusoidal transition as described for switch Q1, but from a $V_{DS1}$ of 100 vdc. At t=1603.3 nanoseconds the transition of $V_{DS2}$ from 100 vdc to zero is complete and the transition of the sinusoidal current $I_{DS2}$ from zero to a high state commences. $I_{DS2}$ flows out of the transformer T1, in opposite direction to the flow of $I_{DS1}$. A zero wait state of t=370 nanoseconds is inserted between the low transition of $V_{DRVA}$ and the high transition of $V_{DRVB}$ and vice versa.

$V_{DRVA}$ or $V_{DRVB}$ is on for a period T=740 nanoseconds, while it is off for a period T=1480 nanoseconds. The period (T) for $V_{DRVA}$ or $V_{DRVB}$ is equal to 2220 nanoseconds. The off period ($T_{OFF}$) for $V_{DRVA}$ and $V_{DRVB}$ varies to in order to provide regulation, but the on period ($T_{ON}$) for $V_{DRVA}$ and $V_{DRVB}$ is constant. The variation $T_{OFF}$ provides for frequency variation within a pre-set boundary.

From the transition of $I_{DS1}$ from zero to the transition of $I_{DS2}$ from zero constitutes one cycle of energy transfer, from the primary side of transformer T1 to the secondary side. Since the period of this cycle T is equal to 1110 nanoseconds, Frequency F=1/T=1/1110= 900 Khz. This is the resonant Frequency $F_r$. While the maximum switching frequency of each switch is 450 KHz, the resonant frequency $F_r$ at the input of the transformer T1 or at node N2 has a characteristic defined by:

$$F_r = 2*\pi*F_{max}$$

A design example is given here for clarity:

| | |
|---|---|
| $P_{out}$ = | 300 watts |
| $V_{in(max)}$ at center tap = | 200 volts max |
| $V_{in(min)}$ = | 100 volts |
| $I_{out(max)}$ = | 60 amps |
| $I_{out(min)}$ = | 10 amps |
| Primary Peak current $I_p$ = | 6 amps |
| Average primary current $I_{avg}$ = | 3 amps |
| $V_{out}$ = | 5 volts |
| Transformer turn ratio N = | 10:1 |
| Transformer leakage inductance = | 0.45 uH |
| Transformer interwind capacitance ($C_w$) = | 115 pF |
| Transformer magnetizing inductance = | 640 uH |
| Operating frequency $F_{conv}$ = | 950 kHz |
| Resonant tank frequency $F_r$ = | $2 * \pi * F_{conv}$ |
| | $2 \times 3.14 \times$ |
| | 950,000 |
| | 6.0 mHz |
| Resonant impedance $Z_r$ = | $V_{in(max)} * N * (I_o)^{-1}$ |
| | $200 \times 10 \times (60)^{-1}$ |
| | 33.3 ohms |
| Resonant inductor $L_r$ = | $Z_r * (F_r)^{-1}$ |
| | 33.3/6 = 5.6 uH |
| Resonant capacitor $C_r$ = | $2 * C_{oss}$ = |
| | $(Z_r * F_r)^{-1}$ |
| | $(33.3 \times 6.0)^{-1}$ = |
| | 5000 pF |
| Each switch $C_{oss}$ = | 2500 pF |

Total energy transferred from primary to secondary side of power transformer per cycle:

$$E_{ICYCLE} = V^2_{in(max)} * C_{oss} * 2^{-1}$$
$$= (200^2 \times 5000 \times 10^{-12}) \times 2^{-1}$$
$$= 100 \text{ uJ}$$

Energy transfer equation can be expressed in terms of inductance and peak primary current:

$$E_{ICYCLE} = L_r * I^2_{peak} * 2^{-1}$$
$$= (5.6 \times 10^{-6} \times 6^2)^{-1} \times 2^{-1}$$
$$= 100.8 \text{ uJ}$$

For a leakage inductance of 0.450 uH if added to the resonant inductor will increase its value to 6 uH. Average energy per cycle will be 108 uJ, an increase of 8%. The addition of leakage inductance in this case is thus functionally insignificant when compared to the prior art having power transformers with significantly high leakage inductance.

The ringing frequency after the switch has turned off is 22 mHz while the energy released is 4.1 uJ. This energy is extremely negligible, hence it does not damage the switching element; the ringing frequency is very high while its amplitude is extremely low. If the leakage inductance is much higher, for example 5 uH, the energy released will be 45 uJ and will require extensive snubbing.

The magnetizing current is given by:

$$I_m = (V_{in} * T_{on}) * L^{-1}_m$$
$$= (200 \times 740 \times 10^{-9}) \times (640 \times 10^{-6})^{-1}$$
$$= 0.231 \text{ amps}$$

This is a very reasonably low magnetizing current that can be utilized for house keeping function.

Figure 6A:
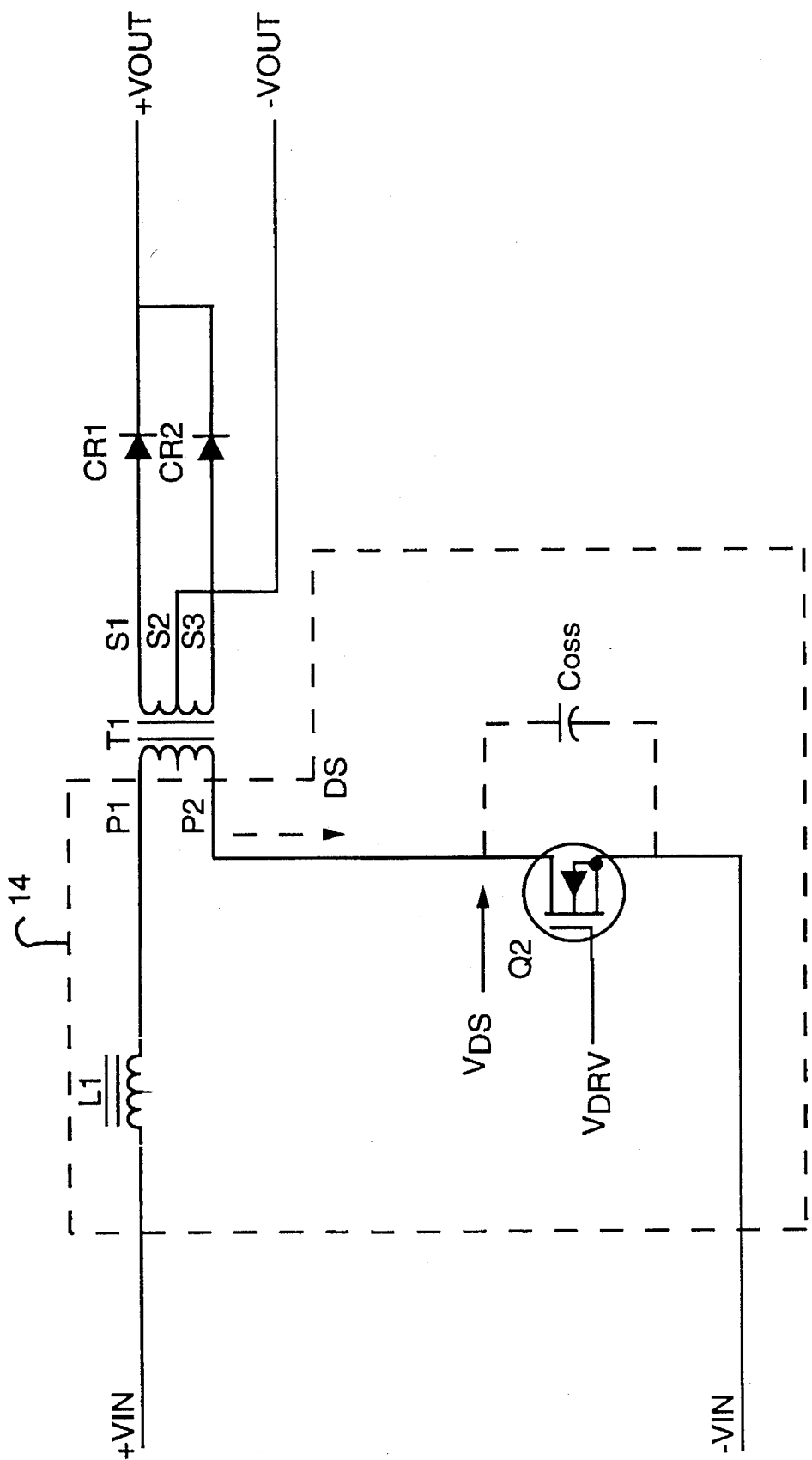
FIG. 6A is a schematic diagram of an alternative single-ended conversion stage of this invention.
Figure 6B:
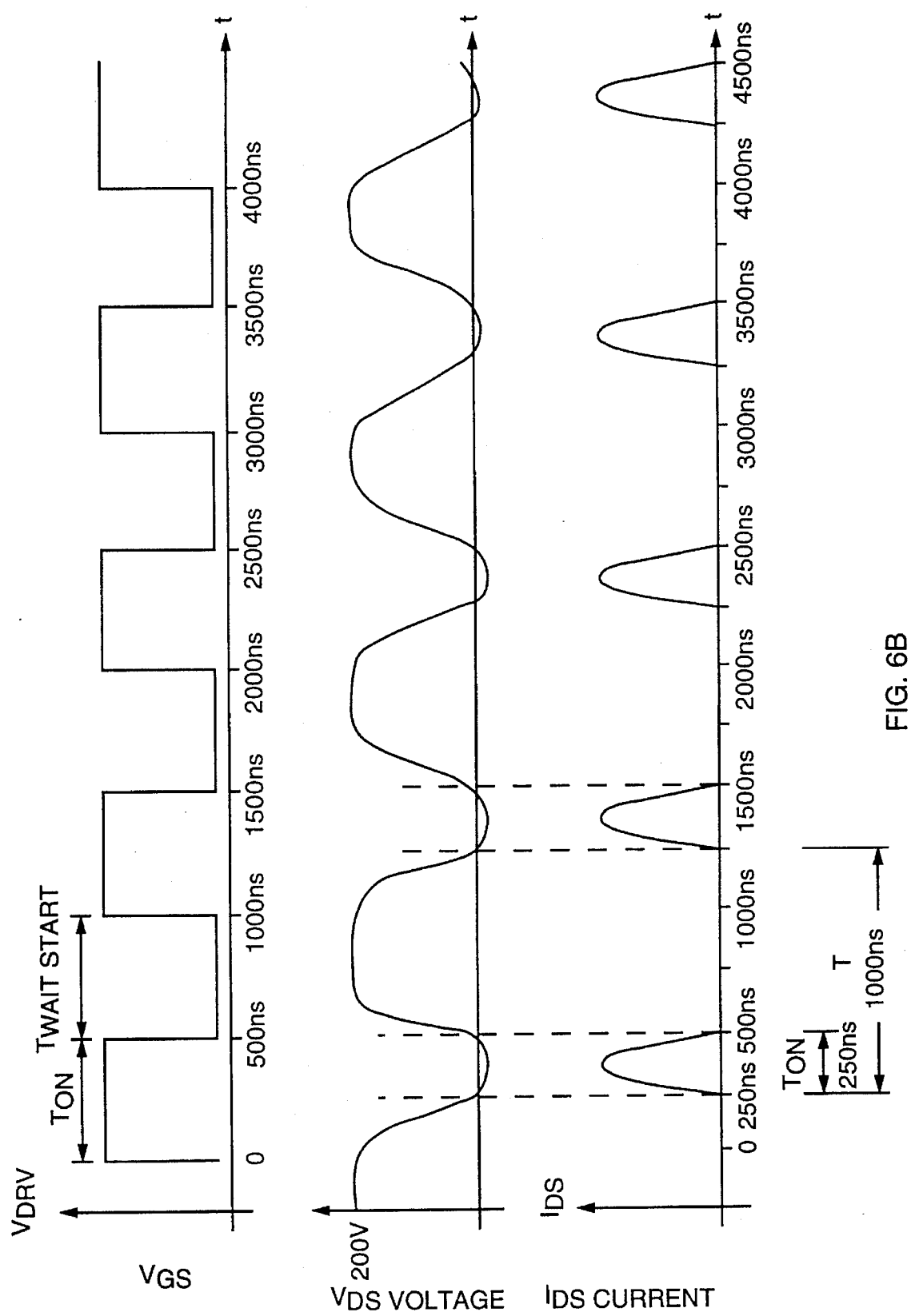
FIG. 6B is a timing diagram illustrating the operation of the conversion stage of FIG. 6A.

EXPLANATION OF SCHEMATIC DIAGRAM AND TIME CHARTS FOR SINGLE ENDED CONFIGURATION (FIGS. 6A and 6B)

In a single ended configuration, the resonant frequency looking into pin P2 of transformer T1 is equal to the switching frequency of Q1. The sequence of events described for Q2 in the case of the double ended configuration applies for Q1 for the single ended configuration. By using $C_{oss}$ which is the parasitic capacitance, to form a resonant tank with a dedicated inductor L1, switching in the mega Hertz range of frequency without switching losses becomes possible, because at very high frequency the value of $C_{oss}$ is very significant for both energy storage and shaping $V_{DS}$ into a sinusoidal wave, which ensures that the fall of $V_{DS}$ will not overlap the rise of $I_{DS}$, thereby producing lossless switching. The high frequency switching allows the efficient transfer of power using an extremely small transformer, providing greater power density, also made possible by the decreased power losses. Further, this arrangement provides for the use of a smaller inductor on the transformer output.

According to the description above the present invention with an integrated USPCM permits input voltage configuration, input under/over voltage sensing, variable frequency modulation, pre-start and operating voltage regulation and high current drive. Further MOSFET junction capacitance provides resonance tank oscillation, increased resonance frequency operation, improved converter efficiency, increased power density and low component count per converter.

Although specific features of the invention are shown in some drawings and not others, this is for convenience only, as the features may be combined as is apparent to those skilled in the art.

What is claimed is:

1. A high-frequency, double-ended, low-loss, high power density power converter, comprising:

three input terminals for receiving voltage input;

first and second transistors connected source-to-drain at a first node in series across the two outer input terminals, each said transistor having an inherent parasitic capacitance;

first and second capacitors connected at a second node in series across the two outer input terminals, the second node comprising the third input terminal;

a low-leakage inductance transformer for coupling power to an output, one side of the transformer primary connected to the first node, said transformer having a leakage inductance of no more than 1 uH so that said leakage inductance has a negligible effect on resonance;

a dedicated inductor connected in series with said transformer primary between the first and second nodes, said inductor and the inherent transistor capacitance thus together forming a resonant energy storage tank on the transformer primary side of the power converter for shifting the voltage input into a sinusoidal waveform, and for transferring power stored in said transistors by reason of the inherent capacitance of said transistors;

wherein said transformer has a magnetizing inductance at least one hundred times greater than the inductance of said dedicated inductor, said transformer thus having a large impedance which causes it to act as an open circuit and thus have a negligible effect on resonance; and means for switching between said transistors at the resonant frequency of said resonant energy storage tank to provide a sinusoidal output current pulse to the transformer primary at the transistor switching rate and to utilize energy stored in the inherent transistor capacitance.

2. The high-frequency, double-ended power converter of claim 1 in which said means for switching includes means for providing a switching delay period after each transistor on period for allowing energy to fully transfer through said transformer.

3. The high-frequency, double-ended power converter of claim 1 in which said dedicated inductor has an inductance value which, together with the inherent transistor capacitance, produces an output current pulse only when the transistor voltage is zero or below to fully negate switching losses.

4. The high-frequency, double-ended power converter of claim 1 in which the input is dc.

5. The high-frequency, double-ended power converter of claim 4 further including means for rectifying ac input to dc.

6. The high-frequency, double-ended power converter of claim 4 in which the full dc input voltage is applied across the outer input terminals.

7. The high-frequency, double-ended power converter of claim 6 in which the third input terminal has an input voltage of half of the full dc input voltage.

8. The high-frequency, double-ended power converter of claim 1 in which said transistors are MOSFET devices.

* * * * *